US 011465621B2

(12) United States Patent
Zhang (10) Patent No.: US 11,465,621 B2
(45) Date of Patent: Oct. 11, 2022

(54) ROAD HAZARD PREDICTION SYSTEM (71) Applicant: Beijing Voyager Technology Co., Ltd., Beijing (CN)

(72) Inventor: Jiang Zhang, San Jose, CA (US)

(73) Assignee: Beijing Voyager Technology Co., Ltd., Beijing (CN)

(*) Notice: Subject to any disclaimer, the term of this patent is extended or adjusted under 35 U.S.C. 154(b) by 307 days.

(21) Appl. No.: 16/719,849

(22) Filed: Dec. 18, 2019

(65) Prior Publication Data
US 2021/0188269 A1 Jun. 24, 2021

(51) Int. Cl.
*B60W 30/14* (2006.01)
*H04L 9/40* (2022.01)

(52) U.S. Cl.
CPC ....... *B60W 30/146* (2013.01); *H04L 63/1416* (2013.01); *B60W 2554/80* (2020.02); *B60W 2555/20* (2020.02); *B60W 2556/10* (2020.02); *B60W 2556/45* (2020.02)

(58) Field of Classification Search
CPC .......... B60W 30/146; B60W 2554/80; B60W 2555/20; B60W 2556/10; B60W 2556/45; B60W 50/0097; H04L 63/1416
See application file for complete search history.

(56) References Cited

U.S. PATENT DOCUMENTS

| 2015/0211870 | A1* | 7/2015 | Nickolaou | G08G 1/164 |
| | | | | 701/28 |
| 2018/0346116 | A1* | 12/2018 | Kundu | B60Q 9/00 |
| 2020/0324766 | A1* | 10/2020 | Zhao | B60W 30/16 |

FOREIGN PATENT DOCUMENTS

WO WO-2019175422 A1 * 9/2019 .......... G08G 1/0125

* cited by examiner

*Primary Examiner* — Rodney A Butler
(74) *Attorney, Agent, or Firm* — Sheppard Mullin Richter & Hampton LLP (57) ABSTRACT

A cloud application may suggest speeds to vehicles based on weather and road conditions in order to improve vehicle safety. Status information associated with a vehicle may be received from one or more computing devices associated with the vehicle. The status information may comprise a location and a speed of the vehicle. A weather condition and a road condition associated with an upcoming location of the vehicle may be obtained. The upcoming location may be determined based at least in part on the received location of the vehicle. A suggested speed at the upcoming location may be determined for the vehicle based at least in part on the weather condition and the road condition. It may be determined that the received speed of the vehicle is greater than the suggested speed. The suggested speed may be sent to the one or more computing devices associated with the vehicle.

20 Claims, 7 Drawing Sheets

ROAD HAZARD PREDICTION SYSTEM

TECHNICAL FIELD

The disclosure relates generally to managing vehicle safety by providing suggestions regarding vehicle operation.

BACKGROUND

It is very dangerous when a vehicle loses traction. The slipperiness of a road is affected by several factors, and it can be hard to determine a risk level. Because of this, it is also difficult to determine a proper driving speed and following distance. This may lead to a vehicle sliding off the road or hitting another vehicle. Antilock braking systems (ABS) and traction control systems (TCS) may aid a driver after traction is lost, however, these systems cannot predict future loses of traction. Vehicle safety may be improved if the vehicle is able to slow down before dangerous conditions are encountered.

SUMMARY

A claimed solution rooted in computer technology overcomes problems specifically arising in the realm of computer technology. In various implementations, a method may include receiving, from one or more computing devices associated with a vehicle, status information associated with the vehicle, where the status information may comprise a location and a speed of the vehicle, and obtaining a weather condition and a road condition associated with an upcoming location of the vehicle. The upcoming location may be determined based at least in part on the received location of the vehicle. The method may also include determining a suggested speed at the upcoming location for the vehicle based at least in part on the weather condition and the road condition, determining that the received speed of the vehicle is greater than the suggested speed, and sending the suggested speed to the one or more computing devices associated with the vehicle.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include receiving, from one or more computing devices associated with a vehicle, status information associated with the vehicle, where the status information may comprise a location and a speed of the vehicle, and obtaining a weather condition and a road condition associated with an upcoming location of the vehicle. The upcoming location may be determined based at least in part on the received location of the vehicle. The operations may also include determining a suggested speed at the upcoming location for the vehicle based at least in part on the weather condition and the road condition, determining that the received speed of the vehicle is greater than the suggested speed, and sending the suggested speed to the one or more computing devices associated with the vehicle.

Yet another aspect of the present disclosure is directed to a non-transitory computer-readable storage medium configured with instructions executable by one or more processors to cause the one or more processors to perform operations. The operations may include receiving, from one or more computing devices associated with a vehicle, status information associated with the vehicle, where the status information may comprise a location and a speed of the vehicle, and obtaining a weather condition and a road condition associated with an upcoming location of the vehicle. The upcoming location may be determined based at least in part on the received location of the vehicle. The operations may also include determining a suggested speed at the upcoming location for the vehicle based at least in part on the weather condition and the road condition, determining that the received speed of the vehicle is greater than the suggested speed, and sending the suggested speed to the one or more computing devices associated with the vehicle.

In some embodiments, the speed of the vehicle may be adjusted by the one or more computing devices associated with the vehicle based on the suggested speed and data collected by one or more sensors associated with the vehicle.

In some embodiments, the status information may further comprise a distance of the vehicle from a front vehicle, an external temperature, a humidity level, or data gathered by one or more sensors associated with the vehicle.

In some embodiments, the weather condition may comprise a type of weather, a level of precipitation, a time period of precipitation, a temperature, a humidity level, or a natural disaster.

In some embodiments, the road condition may comprise a status of snow or ice removal, or occurrence of a traffic accident.

In some embodiments, obtaining the weather condition and the road condition associated with the upcoming location of the vehicle may comprise receiving information about weather conditions and road conditions from a plurality of Internet services, storing the received information in one or more databases, and retrieving information associated with the upcoming location of the vehicle from the one or more databases.

In some embodiments, obtaining the weather condition and the road condition associated with the upcoming location of the vehicle may comprise receiving, from a plurality of other vehicles, data collected by a plurality of sensors associated the other vehicles, and determining information associated with the weather condition or the road condition based at least in part on the received data.

In some embodiments, the determining the suggested speed may comprise feeding the obtained weather condition and the road condition to a model, wherein the model is created based at least in part on historical data associated with the upcoming location, and obtaining an output of the model, wherein the output comprises the suggested speed.

In some embodiments, the model may comprise an algorithmic model or a machine-learning model.

In some embodiments, the output may further comprise a hazard risk associated with the received status information of the vehicle.

In some embodiments, a suggested following distance of the vehicle may be determined based at least in part on the weather condition and road condition, and the suggested following distance may be sent to the one or more computing devices associated with the vehicle.

In some embodiments, updated status information associated with the vehicle at the upcoming location may be received from the one or more computing devices associated with the vehicle. The updated status information may comprise an actual speed of the vehicle at the upcoming location. The suggested speed at the upcoming location may be updated based at least in part on the updated status information.

In some embodiments, it may be determined, based on the updated status information, that a safety incident occurred to the vehicle at the upcoming location, and the suggested speed may be modified to a value smaller than the actual speed of the vehicle at the upcoming location.

In some embodiments, it may be determined, based on the updated status information, that no safety incident occurred to the vehicle at the upcoming location, and the suggested speed may be modified to be equal to the actual speed of the vehicle at the upcoming location.

In some embodiments, a data-security risk for the one or more computing devices associated with the vehicle may be determined; and an alert regarding the data security risk may be sent to the one or more computing devices associated with the vehicle.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein may determine speed and following distance suggestions based on various conditions. An example of an environment related hazard may include a vehicle traveling too fast around a turn on a slick or curvy road. The vehicle may skid out of its lane. Another example may include a vehicle following too close behind another vehicle on a slick road. The vehicle may not be able to stop in time if the front vehicle suddenly stops. The disclosed embodiments may detect that a vehicle is driving too fast or too close to the front vehicle and alert a human driver or autonomous driving system (ADS) before the vehicle hits the slick road. The hazard may be predicted and the driver or ADS may be notified to adjust the vehicle's speed and following distance to the front vehicle.

A proper speed may be determined based on the level of slipperiness and curviness of the road. However, it may not be easy for a human driver or an ADS to measure the actual level of slipperiness and curviness. A cloud service may estimate a safe speed based on other information in order to guide the speed of the vehicle. The cloud service may collect the information from other resources and determine the risk level of the road. The cloud service may also evaluate its estimation using speed and other vehicle status information from vehicles that have passed the same segment of the road and make the prediction more accurate. The risk of the slick roads may be reduced and lives may be saved.

Figure 1:
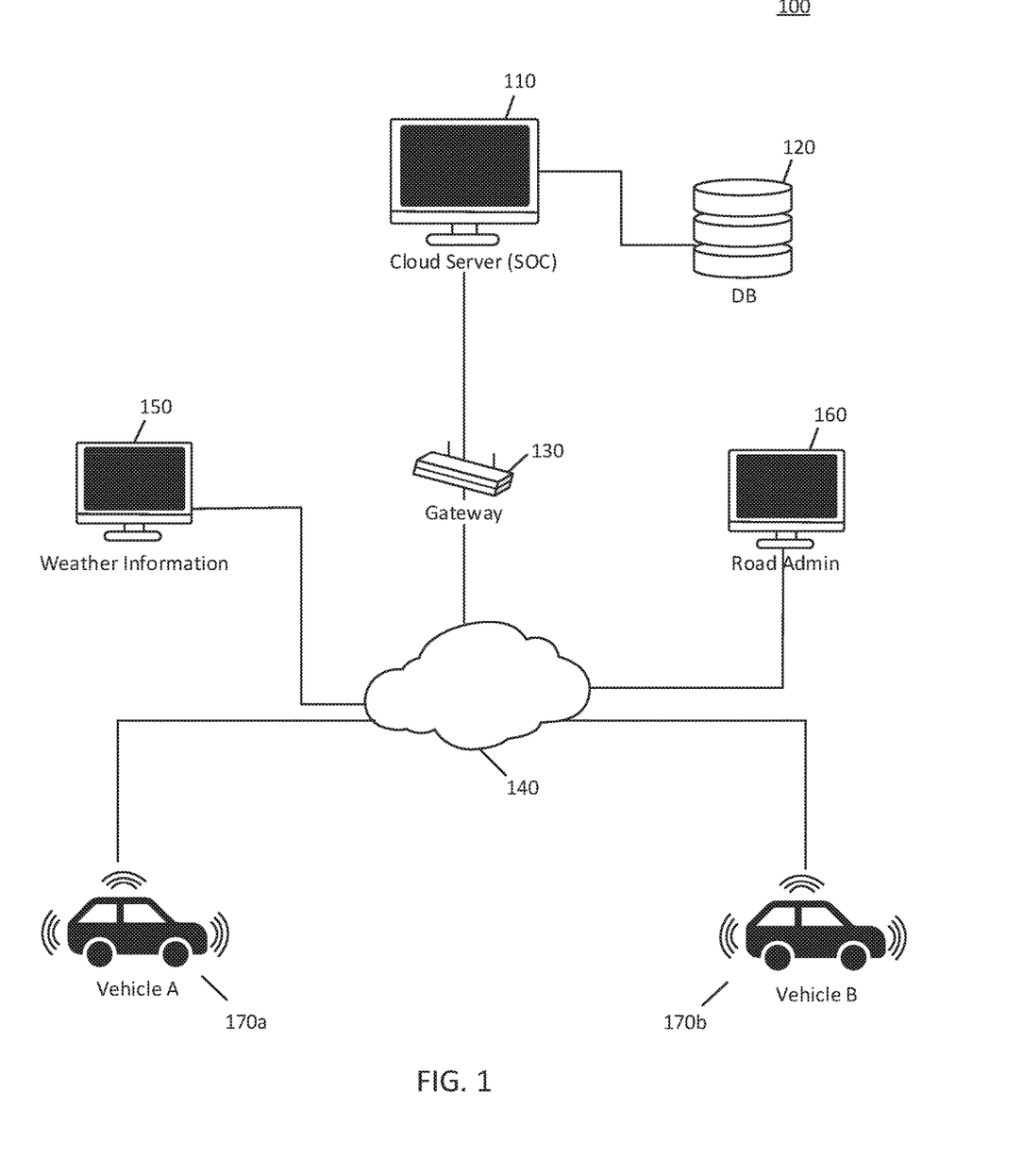
FIG. 1 illustrates an example environment for managing vehicle safety.

FIG. 1 illustrates an example environment 100 in which techniques for managing vehicle safety may be implemented. The example environment 100 may include a cloud server that may be associated with a security operation center (SOC) 110, a database (DB) 120, a gateway 130, network 140, a weather information system 150, a road administration system 160, vehicle A 170a, and vehicle B 170b. It is to be understood that although two vehicles, vehicle A 170a and vehicle B 170b, are shown in FIG. 1, any number of vehicles may be included in the environment 100. Vehicle A 170a and vehicle B 170b may include cars, trucks, boats, trains, autonomous vehicles, electric scooters, and electric bikes.

The SOC 110, DB 120, weather information system 150, road administration system 160 may be implemented in one or more networks, one or more endpoints, one or more servers, or a cloud (e.g. cluster of servers and other devices distributed across a network). Gateway 130 may allow communication between SOC 110 and network 140. Although FIG. 1 does not show a connection from SOC 110 to network 140, SOC 110 may directly connect to network 140. Network 140 may allow communication between SOC 110, DB 120, gateway 130, network 140, weather information system 150, road administration system 160, vehicle A 170a, and vehicle B 170b. Network 140 may comprise the internet, a local area network (LAN), a wireless network, or any combination of the thereof. Devices may communicate through network 140 using various communication protocols. For example, SOC 110 may communicate with vehicle A 170a and vehicle B 170b through a wireless network.

While SOC 110, DB 120, weather information system 150, and road administration system 160 are shown in FIG. 1 as single entities, this is merely for ease of reference and is not meant to be limiting. One or more components or functionalities of SOC 110, DB 120, weather information system 150, and road administration system 160 described herein may be implemented in a single computing device or multiple computing devices. SOC 110, weather information system 150, road administration system 160, vehicle A 170a, and vehicle B 170b may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and memory (e.g., permanent memory, temporary memory). The processor(s) may be configured to perform various operations by interpreting machine-readable instructions stored in the memory.

SOC 110, weather information system 150, road administration system 160, vehicle A 170a, and vehicle B 170b may include other computing resources. In some implementations, SOC 110, weather information system 150, road administration system 160, vehicle A 170a, and vehicle B 170b may include an application specific integrated circuit (ASIC) or a field-programmable gate array (FPGA) configured to perform transaction verification operations associated with one or more decentralized applications. SOC 110, weather information system 150, road administration system 160, vehicle A 170a, and vehicle B 170b may be installed with appropriate software (e.g., platform program, etc.) and/or hardware (e.g., wires, wireless connections, etc.) to access other devices of the environment 100. SOC 110 may include a cloud application which may collect information, update estimated speeds of vehicles on a speed map, and check if the vehicle speeds are safe. Vehicle A 170a, and vehicle B 170b may include in-vehicle applications which may report the vehicle status and check if there is any alert from the cloud application.

The cloud application may be configured to receive status information associated with a vehicle from one or more computing devices associated with the vehicle. The status information may comprise a location and a speed of the vehicle. For example, status information may be received from computing devices associated with vehicle A 170a, and vehicle B 170b when the vehicles pass a location on a road. In some embodiments, vehicle A 170a may pass the location before vehicle B 170b. In some embodiments, all vehicles may constantly report the status information including their current location and current speed. In some embodiments, the status information may include data gathered by one or more sensors associated with the vehicle. Examples of the status information may include: a distance of the vehicle from a front vehicle, an external temperature, and a humidity level, images of the road, and proximity data of surrounding objects. In some embodiments, the status information may be used to determine information about traffic, weather, and road conditions. For example, the speed of the vehicle may indicate traffic information. In some embodiments, a data-security risk may be determined for the one or more computing devices associated with the vehicle. In some embodiments, an alert regarding the data security risk may be sent to the one or more computing devices associated with the vehicle.

The cloud application included in SOC 110 may further be configured to obtain a weather condition and a road condition associated with an upcoming location of the vehicle. The upcoming location may be determined based at least in part on the received location of the vehicle. Obtaining information may include one or more of accessing, acquiring, analyzing, determining, examining, identifying, loading, locating, opening, receiving, retrieving, reviewing, storing, or otherwise obtaining the information. In some embodiments, information about weather conditions and road conditions may be received from a plurality of internet services. The information about weather conditions and road conditions may be obtained from internet services through an application program interfaces (APIs) or through web crawling.

In some embodiments, the weather condition may be obtained from weather information system 150. Weather information system 150 may be an internet weather information system and/or a government weather service (e.g., www.weather.gov, accuweather.com, data.cma.cn). Internet weather information systems may provide network interfaces or APIs to query weather information. In some embodiments, the weather condition may be obtained based on data collected from vehicles. For example, weather information collected from multiple vehicles may be used to build weather models. Examples of the weather condition may include: a type of weather (e.g., rain, snow, fog, lightning), level of precipitation, a time period of precipitation, a temperature, a humidity level, and a natural disaster (e.g., flood, hurricane, tsunami, wildfire).

In some embodiments, the road condition may be obtained from road administration system 160, vehicle A 170a, vehicle B 170b or any combination thereof. Road administration system 160 may be a road administration system (e.g., Interstate Highway Patrol, Department of Transportation, local County/City Government, National Park, etc.). The road administration system may be a website which provides the road condition (e.g., www.dot.ca.gov, icyroadsafety.com). Examples of the road condition may include: a status of snow or ice removal, and occurrence of a traffic accident. In some embodiments, the received information may be stored in one or more databases. In some embodiments, information associated with the upcoming location of the vehicle may be retrieved from the one or more databases. For example, location, road, and weather information may be stored on and retrieved from DB 120.

The cloud application included in SOC 110 may further be configured to determine a suggested speed at the upcoming location for the vehicle based at least in part on the weather condition and the road condition. In some embodiments, a suggested following distance of the vehicle may be determined based at least in part on the weather condition and road condition. In some embodiments, the SOC 110 may estimate a current safe speed and distance to a front vehicle for each location and calculate a hazard risk of the vehicle based on the current vehicle status. The current vehicle status may be based on the collected information and historic data.

In some embodiments, a recommended speed for each location may be calculated using a model. In some embodiments, the obtained weather condition and the road condition may be fed to the model. The model may be created based at least in part on historical data associated with a plurality of locations. An output of the model may be obtained by the cloud application. In some embodiments, the output may include the suggested speed. In some embodiments, the output further may include a hazard risk associated with the received status information of the vehicle. Examples of the model may include: an algorithmic model, and a machine-learning model. An example of an algorithmic model is show in FIG. 2, described further bellow. The algorithmic model may be based on the factors that affect the speed and distances to the front vehicle. The recommended speed and distance may be determined under the weather and road condition at each location using an equation or weighted calculation of the factors affecting speed and distance. A machine learning model may learn from data and be updated by comparing recommended data to result data. An example of an machine learning model is show in FIG. 3, described further below.

The cloud application included in SOC 110 may further be configured to determine that the received speed of the vehicle is greater than the suggested speed at an upcoming location. The suggested speed and suggested following distance may be sent to the one or more computing devices associated with the vehicle. In some embodiments the speed of the vehicle may be adjusting by the one or more computing devices associated with the vehicle based on the suggested speed and data collected by one or more sensors associated with the vehicle. In some embodiments, the SOC 110 may receive updated status information associated with the vehicle at the upcoming location from the one or more computing devices associated with the vehicle after the vehicle has passed that location. The updated status information may include an actual speed of the vehicle at the location. In some embodiments, the suggested speed at the location may be updated based at least in part on the updated status information. The updated status information may include an actual speed and distance reported to the cloud application when the vehicle passes the location. Adjusting the suggested speed and following distance may allow a more accurate prediction under various conditions so that vehicles coming up to the location may be alerted.

In some embodiments, the cloud application may send recommended speed and/or following distance at an upcoming location to the vehicle if the current vehicle speed and/or distance is risky. In some embodiments, the vehicle may adjust its speed and distance based on the recommended speed and distance and other information from its own sensors. The final speed and distance to the front vehicle may be different than the recommended speed and distance. In some embodiments, after the vehicle has passed the location, it may be determined whether a safety incident (e.g., loss of traction, sudden braking, collision) has occurred to the vehicle at the location based on the updated status information. If it is determined that a safety incident has occurred to the vehicle at the location, the suggested speed may be modified to a value smaller than the actual speed of the vehicle at the location. If it is determined that no safety incident occurred to the vehicle at the location, the suggested speed may be modified to be equal to the actual speed of the vehicle at the location.

In some embodiments, an autonomous driving system (ADS) associated with a vehicle may control operation of the vehicle based on recommendations received from the SOC 110. The ADS may make the final determination based on current speed and distance, status information, and the recommendations. For example, the vehicle may be at 50 mph and receive a recommended speed at 45 mph. If there is other traffic in front of the vehicle and behind the vehicle at 50 mph, the vehicle may lower its speed in order to keep a larger distance to the front vehicle in order to have enough time to respond in case something happens. However, the vehicle may maintain a higher speed (e.g. 48 mph) in order not to block the traffic. In this case, if the vehicle passes safely with 48 mph, the cloud application may update the recommended speed to 48 mph.

Figure 2:
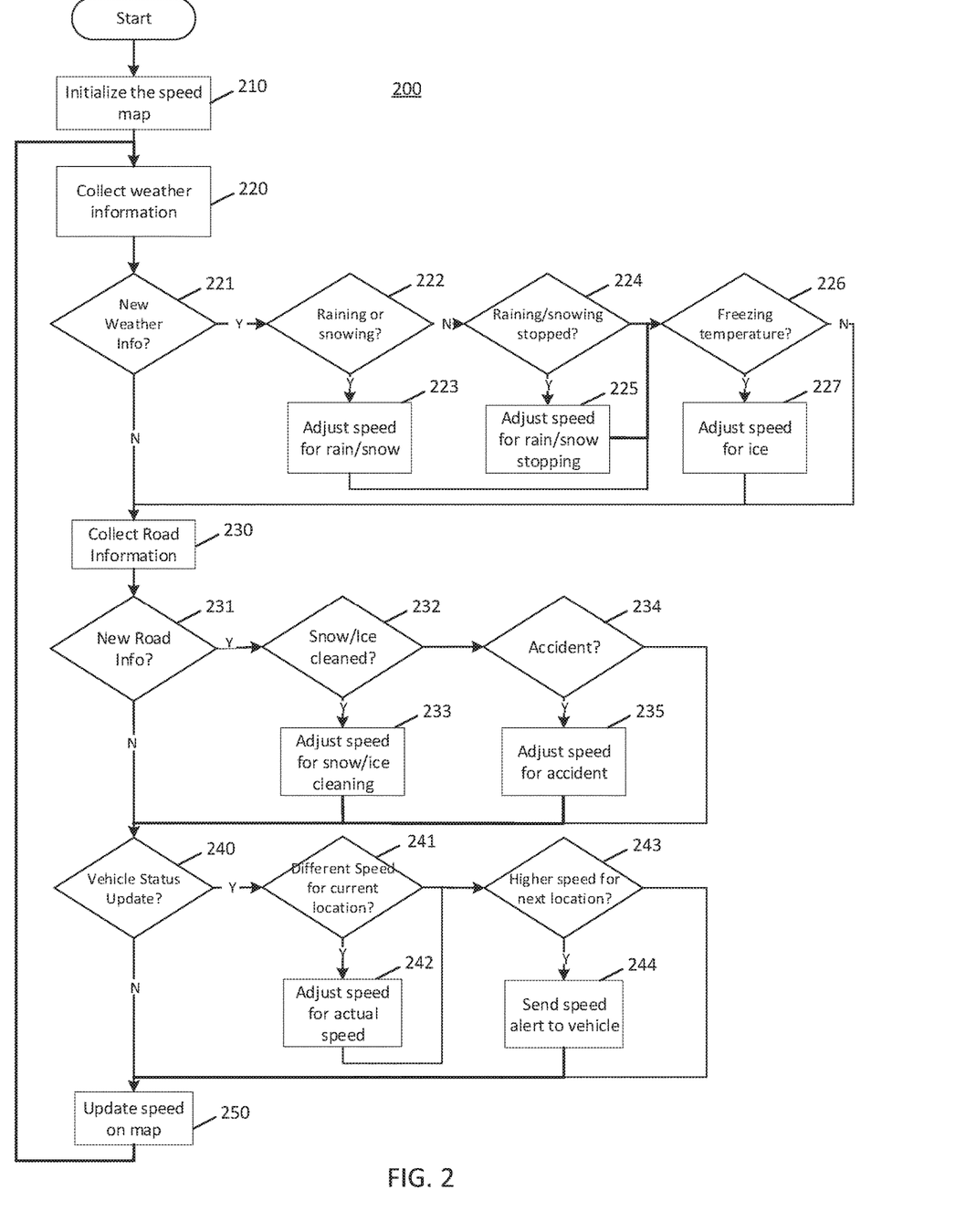
FIG. 2 illustrates a flowchart of an example method for using an algorithmic model to determine a safe speed.

FIG. 2 illustrates a flowchart of an example method 200 for using an algorithmic model to determine a safe speed. The method 200 may be implemented in various environments including, for example, the environment 100 of FIG. 1. The operations of the method 200 presented below are intended to be illustrative. Depending on the implementation, the method 200 may include additional, fewer, or alternative steps performed in various orders or in parallel. The method 200 may be implemented in various computing systems or devices including one or more processors.

The algorithmic model may be based on several related factors. For example, a speed map with several levels of slipperiness may be created, and various weather conditions may be mapped into proper levels. Each level of the map may correspond with a suggested speed. The speed map may include a table of various speed adjustments corresponding with various factors. An example speed map is shown in Table 1.

TABLE 1

| Level | Description | Speed Limit Adjustment | Distance to Front Vehicle Adjustment | Weather Condition |
| --- | --- | --- | --- | --- |
| 0 | Good condition | No adjustment | No adjustment | Sunny warm day |
| 1 | Road w/moisture. Slightly slippery. | Minus 5 mph or 5% | Plus 10 m | Very light rain <1 hrs after light rain stops 1-2 after medium rain 2-4 after heavy rain |
| 2 | Road w/little water. Medium rain. | Minus 10 mph or 10% | Plus 20 m | Medium rain <1 hrs after medium rain 1-2 hrs after heavy rain Snow/ice melt completely |
| 3 | Road w/more water. Heavy rain. Road w/little snow/ice. | Minus 15 mph or 15%, <45 mph | Plus 30 m | Heavy rain <1 hrs heavy rain Light snow Most snow/ice melt |
| 4 | Road w/medium snow/ice | Minus 20 mph or 20%, <40 mph | Plus 40 m | Medium snow Half snow/ice melt |
| 5 | Road w/more ice | Minus 25 mph or 30%, <35 mph | Plus 50 m | More snow/ice |
| 6 | Road w/black ice | <10 mph | Plus 60 m | Black ice |

The speed limit adjustment is shown as both a mile per hour (mph) change and a percentage change. Either value may be used depending on the situation. In some embodiment, Table 1 may be used as an initial speed map. The values in the table may be adjusted as the algorithm executes. Once an algorithmic model is created, a cloud application (e.g., the cloud application included in SOC 110) may collect all kinds of vehicle data, road condition data and weather data to generate recommended speed adjustments and distance adjustment to send to vehicles. The cloud application may collect the final or actual speed of each vehicle to correct the recommended speed if the speed differ.

Updating the recommended speed and the corresponding speed adjustment may allow the values in the speed map to become more accurate over time. In addition, the algorithmic model itself may be improved based on the future data analysis. The algorithm illustrated in FIG. 2 may calculate the adjustment of the speed based on the weather, road condition information and actual vehicle speed. In some embodiments, an algorithmic model may use additional weather related information in a Hazard Prediction System (e.g., hurricane, tsunami, extreme heat, fog, wildfire, lightning, flood and etc.).

With respect to the method 200, at block 210, a speed map may be initialized. For example, the map may be populated with seed data, such as the values shown in Table 1 above. At block 220, weather information may be collected. At block 221, it may be determined whether the weather information is new weather information. If the weather information has not changed, the method may proceed to block 230. If new weather information is received, the method may proceed to block 222. At block 222, it may be determined if the weather information includes raining or snowing. If the weather information does not include raining or snowing, the method may proceed to block 224. If the weather information includes raining or snowing, the method may proceed to block 223. At block 223, the speed may be adjusted for rain or snow. Once the speed is adjusted for rain or snow, the method may proceed to block 226. At block 224, it may be determined if the raining or snowing recently stopped. If there was no raining or snowing that stopped recently, the method may proceed to block 226. If there was raining or snowing that stopped recently, the method may proceed to block 225. At block 225, the speed may be adjusted for the rain or snow that occurred and stopped recently. Once the speed is adjusted, the method may proceed to block 226. At block 226, it may be determined if the weather information includes a freezing temperature. If the weather information does not include a freezing temperature, the method may proceed to block 230. If the weather information includes a freezing temperature, the method may proceed to block 227. At block 227, the speed may be adjusted for ice. Once the speed is adjusted for ice, the method may proceed to block 230.

At block 230, road information may be collected. At block 231, it may be determined whether the road information is new road information. If the road information has not changed, the method may proceed to block 240. If new road information is received, the method may proceed to block 232. At block 232, it may be determined if snow or ice has been cleaned from the road. If snow or ice has not been cleaned from the road, the method may proceed to block 234. If the snow or ice has been cleaned from the road, the method may proceed to block 233. At block 233, the speed may be adjusted for snow and ice cleaning. Once the speed is adjusted for snow and ice cleaning, the method may proceed to block 240. At block 234, it may be determined if there is an accident on the road. If there is not an accident, the method may proceed to block 240. If there is an accident, the method may proceed to block 235. At block 235, the speed may be adjusted for the accident. Once the speed is adjusted for the accident, the method may proceed to block 240.

At block 240, it may be determined whether the vehicle status information has been updated. If the vehicle status information has not changed, the method may proceed to block 250. If vehicle status information has changed, the method may proceed to block 241. At block 241, it may be determined if the actual speed of the vehicle is different than the recommended speed for the current location. If the speeds are not different, the method may proceed to block 241. If the speeds are different, the method may proceed to block 242. At block 242, the recommended speed in the speed map may be adjusted for the actual speed. Once the speed is adjusted the actual speed, the method may proceed to block 243. At block 243, it may be determined if the current speed of the vehicle is higher than the recommended speed for the next location. If the current speed is not higher, the method may proceed to block 250. If the current speed is higher, the method may proceed to block 244. At block 244, a speed alert may be sent to the vehicle. Once the speed alert is sent to the vehicle, the method may proceed to block 250. At block 250, the speed on the speed map may be updated based on the actual speed of the vehicle.

Figure 3:
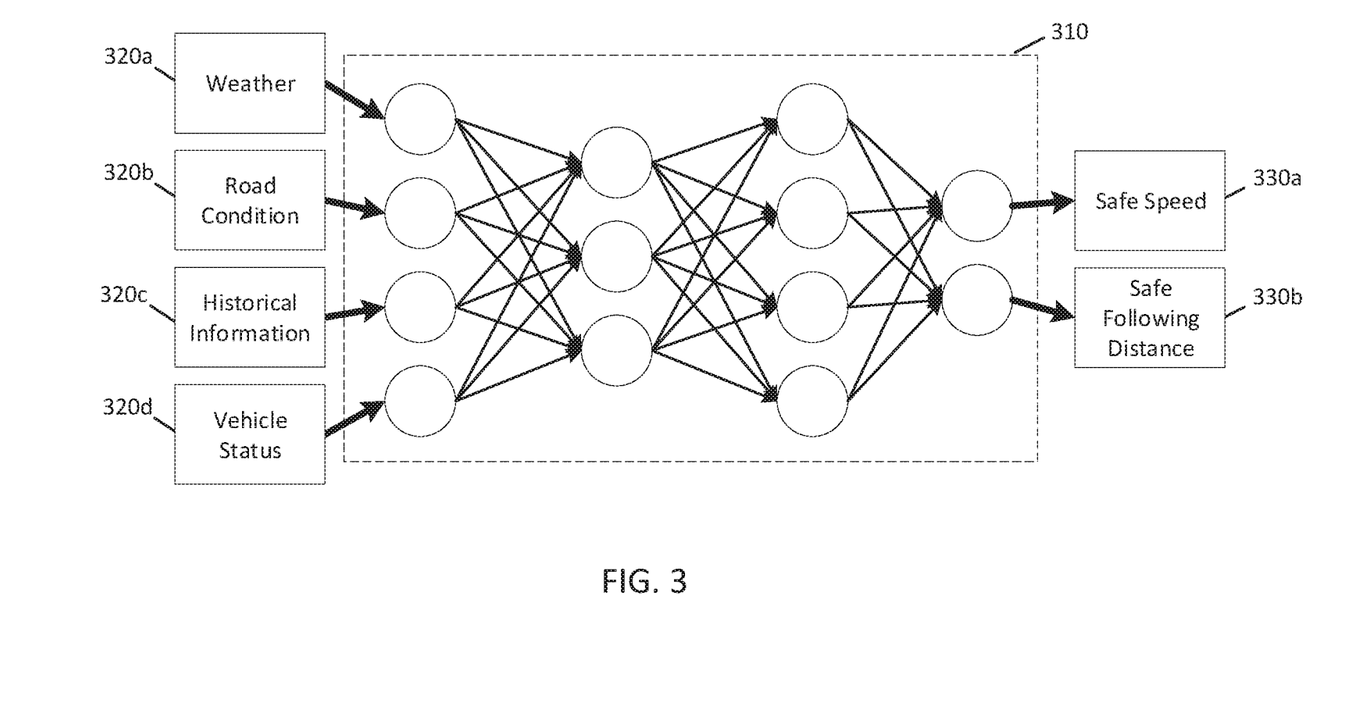
FIG. 3 illustrates an example method for determining safety recommendations using a machine learning model.

FIG. 3 illustrates an example method for determining safety recommendations using a machine learning model 310, in accordance with various embodiments. The machine learning model 310 may be implemented in various computing systems or devices including one or more processors, and various environments including, for example, the environment 100 of FIG. 1. The operations of machine learning model 310 presented below are intended to be illustrative. Depending on the implementation, the machine learning model 310 may include additional, fewer, or alternative elements and perform operations in various orders or in parallel. The machine learning model 310 may determine the safe speed, safe following distance, or other safety factors for a vehicle under different weather, road conditions, and vehicle speeds. For example, the machine learning model 300 may be a deep learning model.

In some embodiments, the machine learning model 310 may comprise a neural network. A neural network may include multiple layers of neurons and weights between the neurons. Each neuron may receive an input, perform a computation using the input, and transmit an output based on the computation. The output from a neuron in one layer may be weighted and fed into one or more neurons in a subsequent layer in the network. A different weight may be used for each neuron. Each layer in the network may include any number of neurons, and the layers may include different numbers of neurons. The network may include any number of layers. A neural network may be trained by inputting sample data, and adjusting the weights until a desired output is achieved. Training a network may also include adjusting the number of layers, and the number of neurons in each layer.

Various factors may be input into the machine learning model 310. The input factors may comprise one or more weather factors 320a. The weather factors 320a may include whether the road has been icy for a certain period (e.g. 1 hour). An icy road condition may be reported by the road administration or a weather report. Another weather factor 320a may include whether it rained or snowed in a past time period. The time period may include the period of time since the last report of the road not being slippery. This may indicate whether the slippery level has gone up. Another weather factor 320a may include whether it is currently raining or snowing. This may indicate whether the slippery level is still going up. Another weather factor 320a may include a temperature in the past period and current time. This may indicate whether this can make snow/rain into ice to add the slippery level. The input factors may comprise one or more road condition factors 320b. The road condition factors 320b may include whether there is snow on the road or when the snow on the road was cleaned. This may indicate whether the road is currently slippery or was slippery in the past. The input factors may comprise one or more historical information factors 320c which may include, for example, an average safe speed from the past data in a similar condition. The historical information factors 320c may also include whether any accident has occurred at any spot in front of the vehicle in the past under similar conditions and a similar speed of that vehicle. The input factors may comprise one or more vehicle status factors 320d, which may include, for example, whether there is a vehicle in front, the speed of that vehicles, and whether that vehicle is driving safely (e.g., speed, swerving, following distance, etc.). Outputs including safe speeds 330a and safe following distances 330b may be obtained from machine learning model 310. The outputs may be used to determine if the current vehicle speed and distance is safe under the current situation. If the speed and distance are not safe, an alert may be sent to the vehicle.

An example scenario of suggesting a speed and following distance may include a vehicle on a segment of road in a national park with a legal speed limit of 55 mph. The suggested speed for a certain location may initially be set to 55 mph. If a weather report of light rain is received, a cloud application (e.g., the cloud application included in SOC 110) may update the suggested speed to 50 mph based on the weather information. If the weather condition becomes medium rain, the suggested speed may be updated to 45 mph. If a vehicle has safely passed the location on the road at 48 mph, the cloud application may update the suggested speed to 48 mph. If a vehicle loses traction at 45 mph, the suggested speed may be lowered (e.g., 40 mph). A loss of traction may indicated that the road is slippery. A loss of traction may be detected based on moving distance and speed. Once the rain stops, the suggested speed may be updated higher gradually while the road surface is drying. For example, the suggested speed may be increased by one mph every 10 minutes.

If there is a medium level of snow, the cloud application may update the suggested speed to 35 mph. If the temperature is below freezing point and black ice may be on the road, the suggested speed may be updated to 10 mph. If the national park reports that the snow and ice is cleaned up after the snow stops, the cloud application may update the suggested speed to 50 mph. If a vehicle is approaching the location at 55 mph based on the legal speed limit, and the current suggested speed is 45 mph, the cloud application may send an alert to the vehicle to lower the speed. The vehicle may consider the alert and the current situation to determine a proper speed. For example, if the front vehicle is driving at 48 mph, the vehicle may keep a safe distance to the front vehicle and follow at 48 mph. If there is no front vehicle, the vehicle may lower its speed to 45 mph to keep the vehicle safe. This is an illustrative example of using road, weather, and vehicle related information to predict a risk for the vehicle and help the vehicle keep a safe speed under special weather or road conditions. Additional and different input information and output results may be used.

Figure 4:
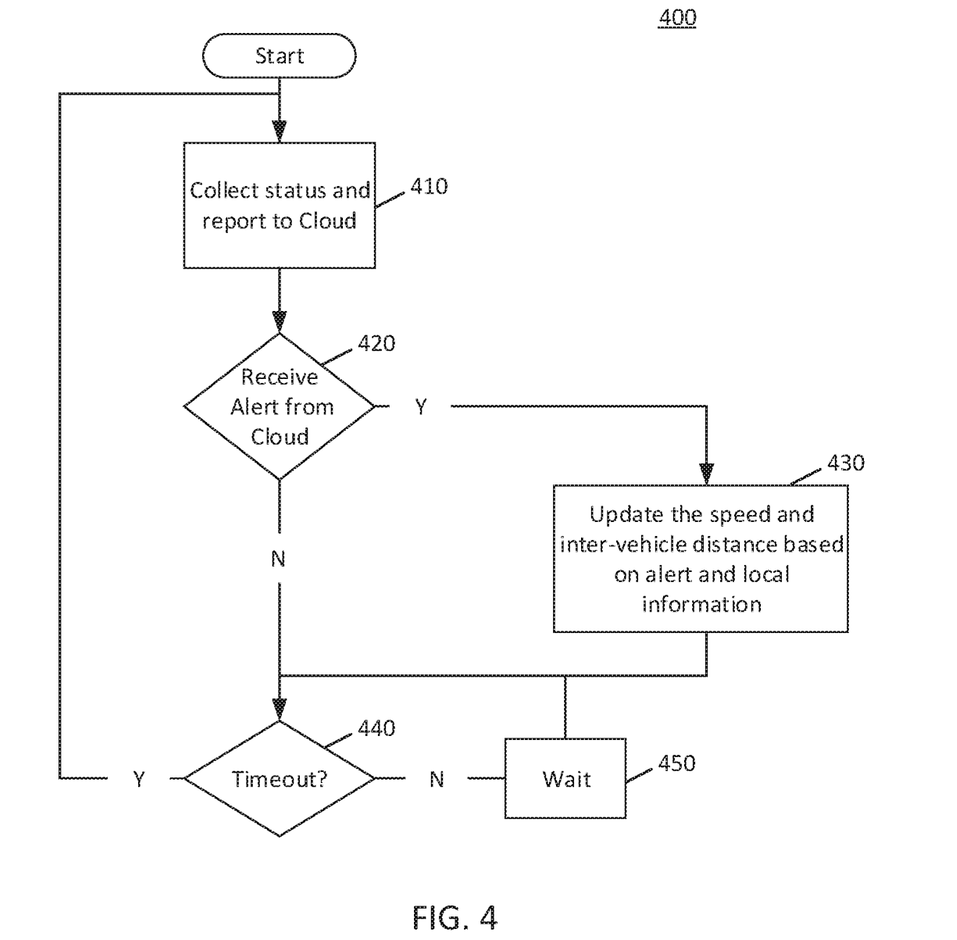
FIG. 4 illustrates a flowchart of an example method for maintaining a safe driving speed and following distance in a vehicle.

FIG. 4 illustrates a flowchart of an example method 400 for maintaining a safe driving speed and following distance in a vehicle, according to various embodiments of the present disclosure. The method 400 may be implemented in various environments including, for example, the environment 100 of FIG. 1. The operations of the method 400 presented below are intended to be illustrative. Depending on the implementation, the method 400 may include additional, fewer, or alternative steps performed in various orders or in parallel. The method 400 may be implemented in various computing systems or devices including one or more processors. The method 400 may comprise an in-vehicle application. For example, the in-vehicle application may be located in vehicle A 170a or vehicle B 170b. The in-vehicle application may report its status to a cloud application (e.g., the cloud application included in SOC 110) and receives recommendation from the cloud application. The alert from the cloud application may be considered together with other local information from sensors on the vehicle to make a final decision.

With respect to the method 400, at block 410, a status (e.g., location, speed, distance to front vehicle, external temperature, humidity) of a vehicle may periodically be collected and reported to a cloud application. The cloud application may process the data and send a recommendation back if the cloud application determines any potential risk.

At block 420, it may be determined if an alert has been received from the cloud application. If not, the method may proceed to step 440. If an alert is received from the cloud application, the method may proceed to step 430.

At 430, the speed and inter-vehicle following distance may be updated based on the alert and local information. In some embodiments, an autonomous driving system (ADS) may not follow the recommendation in the alert from the cloud application. The ADS may make a final decision based on sensor information from the vehicle combined with the cloud application recommendation. For example, the current speed of the vehicle may be 65 mph and the cloud application may recommend 55 mph because of a potentially slick road. If the ADS determines that all front vehicles are safely driving at 65 mph, the ADS may increase the distance to a front vehicle. This may give the vehicle space to stop in case of an accident, and still follow the traffic at 65 mph. At block 440, it may be determined whether a timeout period has lapsed. If a timeout has occurred, the method may loop back to block 410. If a timeout has not occurred, the method may proceed to block 450. At block 450, the method may wait for a preset amount of time. Afterwards, the method may loop back to block 440.

Figure 5:
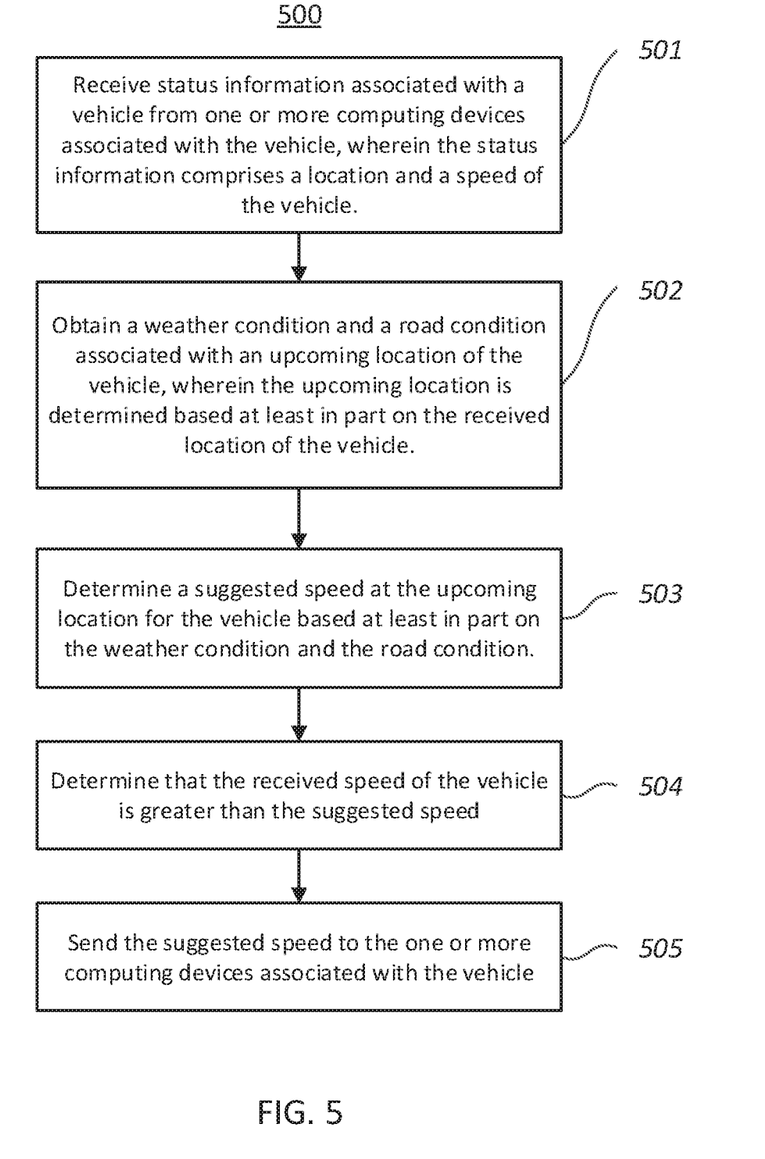
FIG. 5 illustrates a flowchart of an example method for managing vehicle safety.

FIG. 5 illustrates a flowchart of an example method 500 for managing vehicle safety, according to various embodiments of the present disclosure. The method 500 may be implemented in various environments including, for example, the environment 100 of FIG. 1. The operations of the method 500 presented below are intended to be illustrative. Depending on the implementation, the method 500 may include additional, fewer, or alternative steps performed in various orders or in parallel. The method 500 may be implemented in various computing systems or devices including one or more processors.

With respect to the method 500, at block 501, status information associated with a vehicle may be received from one or more computing devices associated with the vehicle. The status information may comprise a location and a speed of the vehicle. At block 502, a weather condition and a road condition associated with an upcoming location of the vehicle may be obtained. The upcoming location may be determined based at least in part on the received location of the vehicle. At block 503, a suggested speed at the upcoming location may be determined for the vehicle based at least in part on the weather condition and the road condition. At block 504, it may be determined that the received speed of the vehicle is greater than the suggested speed. At block 505, the suggested speed may be sent to the one or more computing devices associated with the vehicle.

Figure 6:
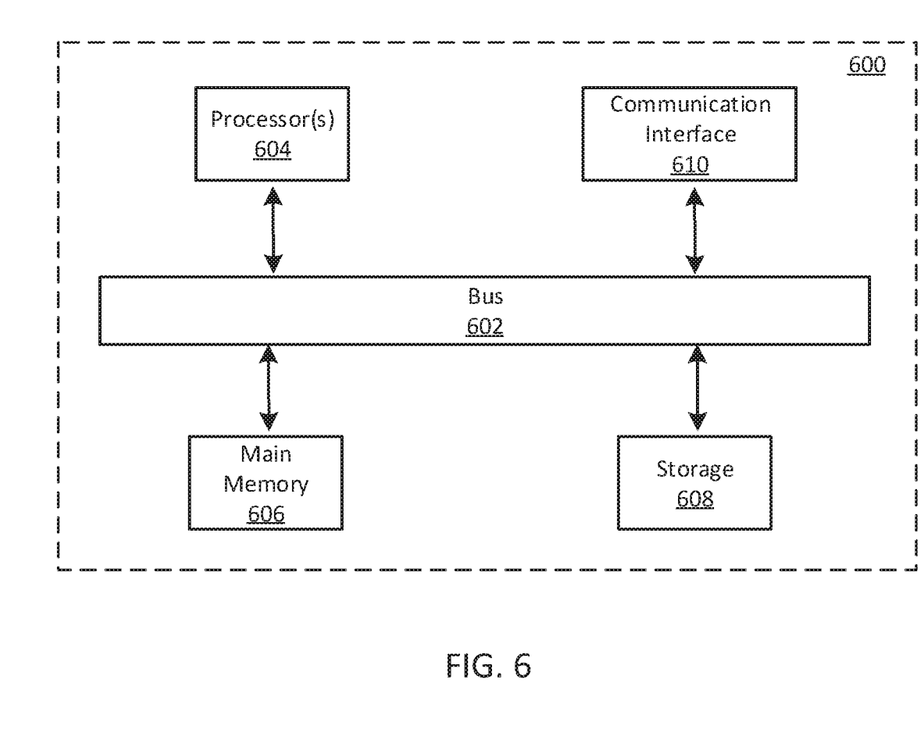
FIG. 6 is a block diagram that illustrates a computer system upon which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render computer system 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 608. Execution of the sequences of instructions contained in main memory 606 causes processor(s) 604 to perform the process steps described herein.

For example, The computing system 600 may be used to implement the SOC 110, DB 120, gateway 130, network 140, weather information system 150, road administration system 160, vehicle A 170a, and vehicle B 170b shown in FIG. 1. As another example, the processes/methods shown in FIGS. 2-5 and described in connection with this figure may be implemented by computer program instructions stored in main memory 606. When these instructions are executed by processor(s) 604, they may perform the steps as shown in FIGS. 2-5 and described above. In alternative embodiments, hard-wired circuitry may be used in place of or in combination with software instructions.

The computer system 600 also includes a communication interface 610 coupled to bus 602. Communication interface 610 provides a two-way data communication coupling to one or more network links that are connected to one or more networks. As another example, communication interface 610 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Figure 7:
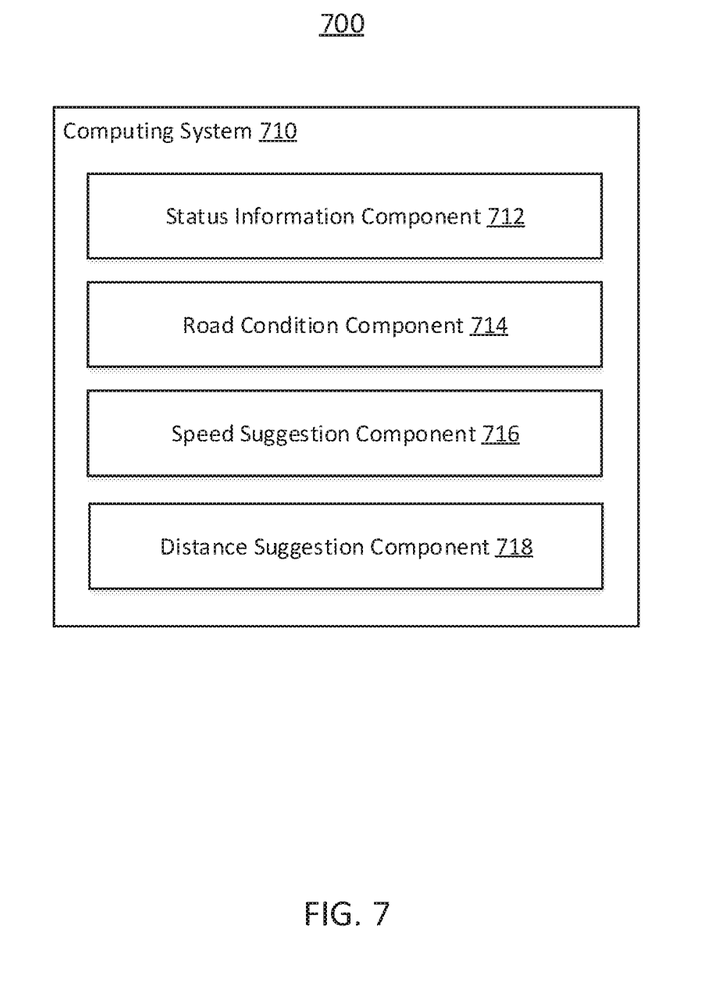
FIG. 7 illustrates an example computing system for managing vehicle safety.

FIG. 7 illustrates an example environment 700 for managing vehicle safety, in accordance with various embodiments. The example environment 700 may include a computing system 702. The computing system 702 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and memory (e.g., permanent memory, temporary memory). The processor(s) may be configured to perform various operations by interpreting machine-readable instructions stored in the memory. The computing system 702 may include other computing resources. In some implementations, computing system 702 may comprise a single self-contained hardware device configured to be communicatively coupled or physically attached to a component of a computer system. In some implementations, computing system 702 may include an application specific integrated circuit (ASIC) or a field-programmable gate array (FPGA) configured to perform transaction verification operations associated with one or more decentralized applications.

The computing system 702 may include a status information component 712, a road condition component 714, and a speed suggestion component 716. In some embodiments the computing system 702, may further include a distance suggestion component 718. The computing system 702 may include other components. While the computing system 702 is shown in FIG. 7 as a single entity, this is merely for ease of reference and is not meant to be limiting. One or more components or one or more functionalities of the computing system 702 described herein may be implemented in a single computing device or multiple computing devices. In some embodiments, one or more components or one or more functionalities of the computing system 702 described herein may be implemented in one or more networks (e.g., enterprise networks), one or more endpoints, one or more servers, or one or more clouds. A server may include hardware or software which manages access to a centralized resource or service in a network. A cloud may include a cluster of servers and other devices which are distributed across a network. The computing system 702 may be implemented on or as various devices such as mobile phone, tablet, server, computer, vehicle, etc. The system 702 above may be installed with appropriate software (e.g., platform program, etc.) and/or hardware (e.g., wires, wireless connections, etc.) to access other devices of the environment 700.

The status information component 712 may be configured to receive status information associated with a vehicle from one or more computing devices associated with the vehicle. The status information may comprise a location and a speed of the vehicle. Examples of the status information may include: a distance of the vehicle from a front vehicle, external temperature, a humidity level, and data gathered by one or more sensors associated with the vehicle. In some embodiments, updated status information associated with the vehicle at a location that the vehicle just passed may be received from the one or more computing devices associated with the vehicle. The updated status information may include an actual speed of the vehicle at the location. In some embodiments, a data-security risk may be determined for the one or more computing devices associated with the vehicle. In some embodiments, an alert regarding the data security risk may be sent to the one or more computing devices associated with the vehicle The road condition component 714 may be configured to obtain a weather condition and a road condition associated with an upcoming location of the vehicle. The upcoming location may be determined based at least in part on the received location of the vehicle. Examples of the weather condition may include: a type of weather, a level of precipitation, a time period of precipitation, a temperature, a humidity level, and a natural disaster. Examples of the road condition may include: a status of snow or ice removal, and of a traffic accident. In some embodiments, information about weather conditions and road conditions may be received from a plurality of Internet services. The received information may be stored in one or more databases. Information associated with the upcoming location of the vehicle may be retrieved from the one or more databases.

The speed suggestion component 716 may be configured to determine a suggested speed at the upcoming location for the vehicle based at least in part on the weather condition and the road condition. In some embodiments, the obtained weather condition and the road condition may be fed to a model. The model may be created based at least in part on historical data associated with the upcoming location. An output of the model may be obtained. In some embodiments, the output may include the suggested speed. In some embodiments, the output further may include a hazard risk associated with the received status information of the vehicle. Examples of the model may include: an algorithmic model, and a machine-learning model.

The speed suggestion component 716 may further be configured to determine that the received speed of the vehicle is greater than the suggested speed. The suggested speed may be sent to the one or more computing devices associated with the vehicle. In some embodiments the speed of the vehicle may be adjusting by the one or more computing devices associated with the vehicle based on the suggested speed and data collected by one or more sensors associated with the vehicle. In some embodiments, the suggested speed at the upcoming location may be updated based at least in part on the updated status information. In some embodiments, it may be determined whether a safety incident has occurred to the vehicle at the upcoming location based on the updated status information. If it is determined that a safety incident has occurred to the vehicle at the upcoming location, the suggested speed may be modified to a value smaller than the actual speed of the vehicle at the upcoming location. If it is determined that no safety incident occurred to the vehicle at the upcoming location, the suggested speed may be modified to be equal to the actual speed of the vehicle at the upcoming location.

The distance suggestion component 718 may be configured to determine a suggested following distance of the vehicle based at least in part on the weather condition and road condition. The suggested following distance may be sent to the one or more computing devices associated with the vehicle.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A method for managing vehicle safety, comprising:
sending, by one or more computer devices associated with a vehicle to one or more servers, status information associated with the vehicle, wherein the status information comprises a location and a speed of the vehicle;
obtaining, by the one or more computer devices from the one or more servers, a suggested speed at an upcoming location for the vehicle when the speed of the vehicle is greater than the suggested speed, wherein the upcoming location is based at least in part on the location of the vehicle, and wherein the suggested speed is based at least in part on a weather condition and a road condition associated with the upcoming location of the vehicle;
adjusting, by the one or more computer devices, the speed of the vehicle based on the suggested speed;
sending, by the one or more computer devices to the one or more servers, updated status information associated with the vehicle at the upcoming location for updating the suggested speed at the upcoming location based at least in part on the updated status information, wherein the updated status information comprises an actual speed of the vehicle at the upcoming location, and wherein updating the suggested speed comprises, when a safety incident occurred to the vehicle at the upcoming location, modifying the suggested speed to a value smaller than the actual speed of the vehicle at the upcoming location;
from the one or more servers, obtaining, by one or more computer devices of a different vehicle approaching the upcoming location, the updated suggested speed; and
adjusting, by the one or more computer devices of the different vehicle, a speed of the different vehicle based on the updated suggested speed.

2. The method of claim 1, further comprising collecting, by one or more sensors associated with the vehicle, data, wherein adjusting the speed of the vehicle based on the suggested speed comprises:

adjusting, by the one or more computer devices associated with the vehicle, the speed of the vehicle based on the suggested speed and the data collected by one or more sensors associated with the vehicle.

3. The method of claim 1, wherein the status information further comprises:
a distance of the vehicle from a front vehicle;
an external temperature;
a humidity level; or
data gathered by one or more sensors associated with the vehicle.

4. The method of claim 1, wherein the weather condition comprises:
a type of weather;
a level of precipitation;
a time period of precipitation;
a temperature;
a humidity level; or
a natural disaster.

5. The method of claim 1, wherein the road condition comprises:
a status of snow or ice removal; or
occurrence of a traffic accident.

6. The method of claim 1, further comprising:
receiving, by the one or more servers, information about weather conditions and road conditions from a plurality of Internet services;
storing, by the one or more servers, the received information in one or more databases;
retrieving, by the one or more servers, the weather condition and the road condition information from the one or more databases; and
determining, by the one or more servers, the suggested speed at the upcoming location for the vehicle based at least in part on the weather condition and the road condition associated with the upcoming location of the vehicle.

7. The method of claim 1,
further comprising:
receiving, by the one or more servers from a plurality of other vehicles, data collected by a plurality of sensors associated the other vehicles;
determining, by the one or more servers, the weather condition or the road condition based at least in part on the received data; and
determining, by the one or more servers, the suggested speed at the upcoming location for the vehicle based at least in part on the weather condition and the road condition associated with the upcoming location of the vehicle.

8. The method of claim 1, further comprising:
feeding, by the one or more servers, the weather condition and the road condition to a model; and
obtaining, by the one or more servers, an output of the model as the suggested speed.

9. The method of claim 8, wherein safety incident comprises loss of traction, sudden braking, or collision.

10. The method of claim 8, wherein the output further comprises:
a hazard risk associated with the status information of the vehicle.

11. The method of claim 1, further comprising:
determining, by the one or more servers, a suggested following distance of the vehicle based at least in part on the weather condition and road condition; and sending, by the one or more servers, the suggested following distance to the one or more computer devices associated with the vehicle.

12. The method of claim 1, further comprising:
receiving, by the one or more servers from the one or more computer devices associated with the vehicle, the updated status information associated with the vehicle at the upcoming location; and
updating, by the one or more servers, the suggested speed at the upcoming location based at least in part on the updated status information.

13. The method of claim 8, further comprising:
creating, by the one or more servers, a machine learning model comprising a neural network as the model, wherein the neural network comprises multiple layers of neurons and weights between the neurons; and
training, by the one or more servers, the machine learning model by adjusting the weights, adjusting a number of the layers, and/or adjusting a number of neurons of each of the layers.

14. The method of claim 8, further comprising:
creating, by the one or more servers, an algorithmic model comprising mapping among road slipperiness, weather, and vehicle speed limit adjustment as the model; and
adjusting the vehicle speed limit adjustment by executing an algorithm of the algorithm model.

15. The method of claim 1, further comprising:
determining, by the one or more servers, a data security risk for the one or more computer devices associated with the vehicle; and
sending, by the one or more servers, an alert regarding the data security risk to the one or more computer devices associated with the vehicle.

16. A system for managing vehicle safety, comprising one or more processors and one or more non-transitory computer-readable memories coupled to the one or more processors and configured with instructions executable by the one or more processors to cause the system to perform operations comprising:
sending, from a vehicle to one or more servers, status information associated with a vehicle, wherein the status information comprises a location and a speed of the vehicle;
obtaining, from the one or more servers, a suggested speed at an upcoming location for the vehicle when the speed of the vehicle is greater than the suggested speed, wherein the upcoming location is based at least in part on the location of the vehicle, and wherein the suggested speed is based at least in part on a weather condition and a road condition associated with the upcoming location of the vehicle;
adjusting the speed of the vehicle based on the suggested speed;
sending, from the vehicle to the one or more servers, updated status information associated with the vehicle at the upcoming location for updating the suggested speed at the upcoming location based at least in part on the updated status information, wherein the updated status information comprises an actual speed of the vehicle at the upcoming location, and wherein updating the suggested speed comprises (i) when a safety incident occurred to the vehicle at the upcoming location, modifying the suggested speed to a value smaller than the actual speed of the vehicle at the upcoming location, or (ii) when no safety incident occurred to the vehicle at the upcoming location, modifying the suggested speed to be equal to the actual speed of the vehicle at the upcoming location;

from the one or more servers, obtaining, at a different vehicle approaching the upcoming location, the updated suggested speed; and adjusting a speed of the different vehicle based on the updated suggested speed.

17. The system of claim 16, further comprising:

feeding, by the one or more servers, the weather condition and the road condition to a model; and obtaining, by the one or more servers, an output of the model as the suggested speed.

18. The system of claim 16, the operations further comprising:

determining a suggested following distance of the vehicle based at least in part on the weather condition and road condition; and sending the suggested following distance to one or more computer devices associated with the vehicle.

19. A non-transitory computer-readable storage medium configured with instructions executable by one or more processors to cause the one or more processors to perform operations comprising:

receiving, from one or more computer devices associated with a vehicle, status information associated with the vehicle, wherein the status information comprises a location and a speed of the vehicle;

obtaining a weather condition and a road condition associated with an upcoming location of the vehicle, wherein the upcoming location is determined based at least in part on the received location of the vehicle;

determining a suggested speed at the upcoming location for the vehicle based at least in part on the weather condition and the road condition;

determining that the received speed of the vehicle is greater than the suggested speed; and sending the suggested speed to the one or more computer devices associated with the vehicle;

receiving, from the one or more computer devices associated with the vehicle, updated status information associated with the vehicle at the upcoming location, wherein the updated status information comprises an actual speed of the vehicle at the upcoming location;

updating the suggested speed at the upcoming location based at least in part on the updated status information, wherein updating the suggested speed comprises:

(i) determining, based on the updated status information, that a safety incident occurred to the vehicle at the upcoming location, and modifying the suggested speed to a value smaller than the actual speed of the vehicle at the upcoming location; or (ii) determining, based on the updated status information, that no safety incident occurred to the vehicle at the upcoming location, and modifying the suggested speed to be equal to the actual speed of the vehicle at the upcoming location; and sending the updated suggested speed to a different vehicle approaching the upcoming location for adjusting a speed of the different vehicle based on the updated suggested speed.

20. The non-transitory computer-readable storage medium of claim 19, the operations further comprising:

determining a suggested following distance of the vehicle based at least in part on the weather condition and road condition; and sending the suggested following distance to the one or more computer devices associated with the vehicle.

\* \* \* \* \*